(12) United States Patent
Ananthapadmanabh et al.

(10) Patent No.: US 10,587,680 B2
(45) Date of Patent: Mar. 10, 2020

(54) EFFICIENT TRANSACTION LEVEL WORKLOAD MANAGEMENT ACROSS MULTI-TIER HETEROGENEOUS MIDDLEWARE CLUSTERS

(71) Applicant: International Business Machines Corporation, Armonk, NY (US)

(72) Inventors: Madhu B. Ananthapadmanabh, Bangalore (IN); Michael G. Fitzpatrick, Raleigh, NC (US); Hariharan N. Venkitachalam, Bengaluru (IN)

(73) Assignee: International Business Machines Corporation, Armonk, NY (US)

( * ) Notice: Subject to any disclaimer, the term of this patent is extended or adjusted under 35 U.S.C. 154(b) by 256 days.

(21) Appl. No.: 15/224,730

(22) Filed: Aug. 1, 2016

(65) Prior Publication Data
US 2018/0034903 A1    Feb. 1, 2018

(51) Int. Cl.
*G06F 15/173* (2006.01)
*H04L 29/08* (2006.01)

(52) U.S. Cl.
CPC .............................. *H04L 67/1008* (2013.01)

(58) Field of Classification Search
USPC .......................... 709/226, 223, 225, 224, 219
See application file for complete search history.

(56) References Cited

U.S. PATENT DOCUMENTS

| | | | |
|---|---|---|---|
| 7,532,583 B2 | 5/2009 | Bivens et al. | |
| 7,660,897 B2 | 2/2010 | Hall, Jr. et al. | |
| 9,244,722 B2 | 1/2016 | Burgess et al. | |
| 2015/0113162 A1 | 4/2015 | Chan et al. | |

*Primary Examiner* — Lan Dai T Truong
(74) *Attorney, Agent, or Firm* — Matterson + Sheridan, LLP

(57) ABSTRACT

Systems, methods, and apparatuses to perform an operation receiving, by a first workload manager in a first middleware environment, state information for a plurality of applications executing in a second middleware environment defining, by the first workload manager based on the received state information, a first routing rule in the first middleware environment, and, based on the first routing rule: identifying, by a first application of a plurality of applications executing in the first middleware environment, a second application of the plurality of applications executing in the second middleware environment, and forwarding, by the first application of the plurality of applications executing in the first middleware environment, a first workload to the second application of the plurality of applications executing in the second middleware environment.

14 Claims, 6 Drawing Sheets

US 10,587,680 B2

EFFICIENT TRANSACTION LEVEL WORKLOAD MANAGEMENT ACROSS MULTI-TIER HETEROGENEOUS MIDDLEWARE CLUSTERS

BACKGROUND

The present invention relates to middleware environments, and more specifically, to providing efficient transaction level workload management across multi-tier heterogeneous middleware clusters.

Conventionally, large enterprise computing deployments include a heterogeneous middleware environment spanning across different platforms and infrastructure, also referred to as an n-tier application architecture. For example, application deployments may include middleware systems that are running on both distributed systems (e.g., the TXSeries from IBM) and mainframe systems (e.g., the Z System from IBM). Conventionally, the distributed systems and mainframe systems run on an isolated cluster environment that are managed independently (or unilaterally).

For example, the distributed system may include many applications that interface with a transaction server (e.g., the Customer Information Control System (CICS) Transaction Server) on the mainframe. In such a scenario, the application interactions across the two environments are tightly coupled. However, the workload management aspects of these environments are managed separately, and in an isolated manner.

In such scenarios, workload balancing across the different platform environments is conventionally performed by network dispatchers and load balancer appliances that work at a network connection level. In an online transaction processing (OLTP) environment, these solutions leave much to be desired. Generally, OLTP based middleware environments typically maintain persistent connections. Furthermore, multiple sessions are multiplexed on a single physical connection, so breaking that connection would abruptly terminate all sessions associated with that connection. Additionally, the cost of establishing a new connection is quite high in a distributed environment, as doing so introduces a significant drop in performance.

Hence, the existing solutions are disruptive as the connections are often broken and reconnected whenever there is a request to re-balance persistent connections based on current distribution recommendations, or to change the cluster based on a fail-over event. These shortcomings result in a significant drop in performance and outages for the business applications. Therefore, there is a need to intelligently route traffic between applications in a middleware environment based on the performance and other attributes of the middleware environment.

SUMMARY

In one embodiment, a method comprises receiving, by a first workload manager in a first middleware environment, state information for a plurality of applications executing in a second middleware environment defining, by the first workload manager based on the received state information, a first routing rule in the first middleware environment, and, based on the first routing rule: identifying, by a first application of a plurality of applications executing in the first middleware environment, a second application of the plurality of applications executing in the second middleware environment, and forwarding, by the first application of the plurality of applications executing in the first middleware environment, a first workload to the second application of the plurality of applications executing in the second middleware environment.

In another embodiment, a computer program product comprises a computer-readable storage medium having computer-readable program code embodied therewith, the computer-readable program code executable by a processor to perform an operation comprising receiving, by a first workload manager in a first middleware environment, state information for a plurality of applications executing in a second middleware environment defining, by the first workload manager based on the received state information, a first routing rule in the first middleware environment, and, based on the first routing rule: identifying, by a first application of a plurality of applications executing in the first middleware environment, a second application of the plurality of applications executing in the second middleware environment, and forwarding, by the first application of the plurality of applications executing in the first middleware environment, a first workload to the second application of the plurality of applications executing in the second middleware environment.

In still another embodiment, a system comprises a processor and a memory containing a program, which when executed by the processor, performs an operation comprising receiving, by a first workload manager in a first middleware environment, state information for a plurality of applications executing in a second middleware environment defining, by the first workload manager based on the received state information, a first routing rule in the first middleware environment, and, based on the first routing rule: identifying, by a first application of a plurality of applications executing in the first middleware environment, a second application of the plurality of applications executing in the second middleware environment, and forwarding, by the first application of the plurality of applications executing in the first middleware environment, a first workload to the second application of the plurality of applications executing in the second middleware environment.

DETAILED DESCRIPTION

Embodiments disclosed herein provide context-level intelligent load balancing in heterogeneous middleware environments by configuring the distinct workload management components in each middleware environment to exchange load information and other metadata attributes describing the components (hardware and/or software) in each tier of the middleware environment. In at least one embodiment, the workload management components may use the Server/Application State Protocol (SASP) to exchange weight recommendations and other information related to the respective middleware environments. The workload management components may then map the information received from other workload management components to a native format, and make load balancing decisions based on the native, mapped information. By providing a configuration interface that is customized for each specific middleware, each middleware workload management component can map the exchanged SASP information to its own corresponding format based on the configuration. Doing so allows any middleware environment to be added to an n-tier application architecture without requiring to code for integration with disparate workload managers. Furthermore, the techniques disclosed herein facilitate workload load balancing at a connection level, socket or transaction level, and a site level.

Figure 1:
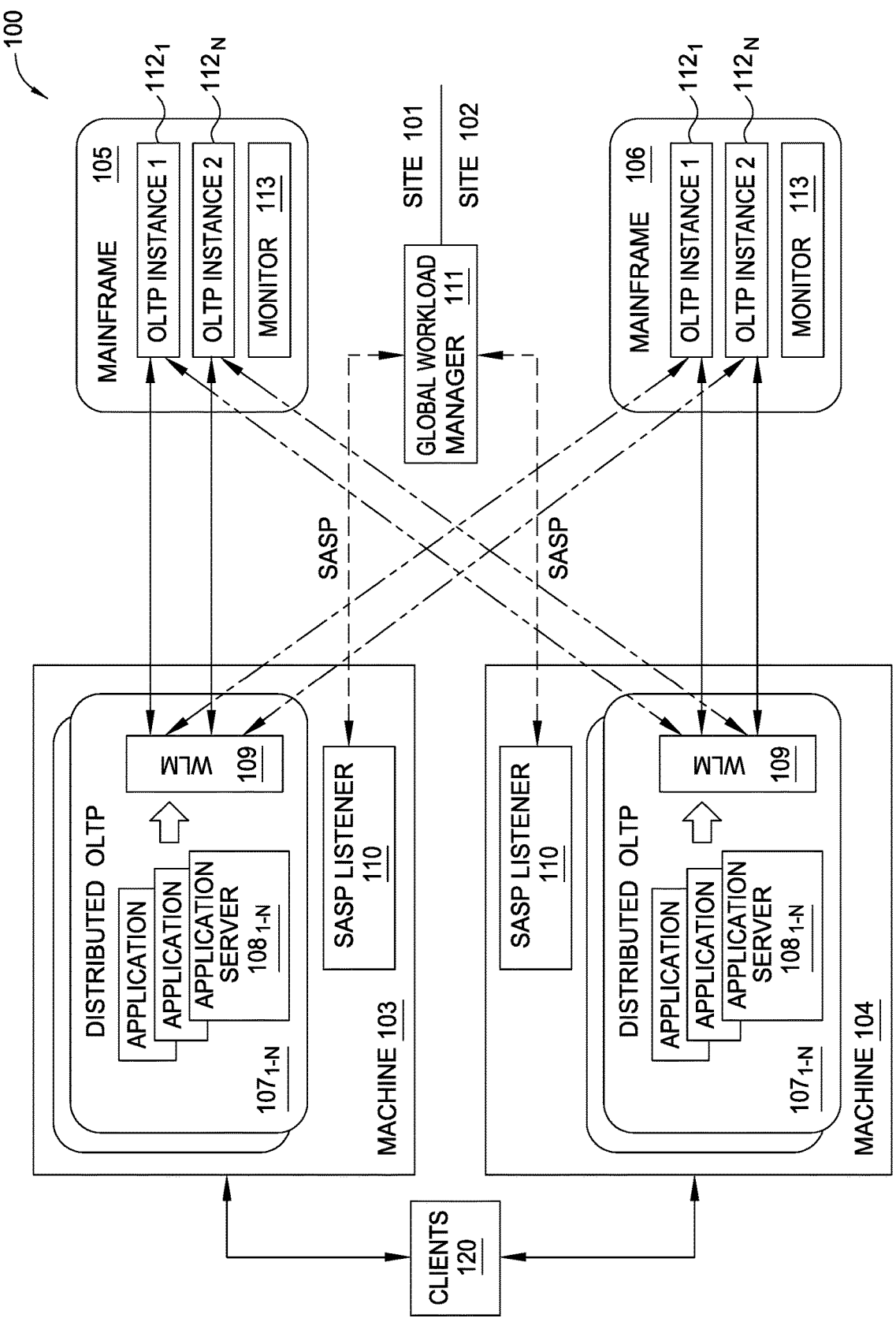
FIG. 1 is a schematic illustrating a system architecture which provides efficient transaction level workload management across multi-tier heterogeneous middleware clusters, according to one embodiment.

FIG. 1 illustrates a system architecture 100 which provides efficient transaction level workload management across multi-tier heterogeneous middleware clusters, according to one embodiment. As shown, the system 100 includes two distinct physical sites, namely sites 101, 102. Each site may host n-tier application architectures that clients 120 may drive workloads through. An example of an n-tier application architecture is an online transaction processing (OLTP) deployment. In the examples depicted in FIG. 1, each site 101, 102 hosts an instance of a hybrid OLTP deployment which includes distributed servers and mainframes. However, any type of hybrid deployment may be used.

As shown, sites 101, 102 include a host machine 103, 104 and a mainframe 105, 106, respectively. The host machines 103, 104 each host a plurality of virtualized distributed OLTP servers $107_{1-N}$ and an instance of an SASP listener 110. The SASP listener 110 is a module which communicates with SASP compliant middleware environments and maps received information from other components in the architecture 100 to native information understood by a corresponding workload manager (WLM) 109. As shown, each distributed OLTP server $107_{1-N}$ may host a plurality of virtualized application servers $108_{1-N}$. Each distributed OLTP server $107_{1-N}$ includes a respective WLM 109, which is an intelligent load balancer that facilitates routing decisions for applications executing on the application servers $108_{1-N}$. The WLM 109 may further facilitate load balancing in the establishment of connections between applications in different tiers of an n-tier application architecture, as well as load balancing for sessions over a given connection.

Generally, as part of the hybrid OLTP environment, the applications executing on the distributed application servers $108_{1-N}$ may process at least a portion of each OLTP transaction. The distributed OLTP of the machines 103, 104, are therefore one tier of an n-tier application architecture. However, these applications may need to transfer the workloads (e.g., the OLTP transactions) to the mainframes 105, 106 for further processing by the respective OLTP applications $112_{1-N}$ hosted thereon. The OLTP applications $112_{1-N}$ hosted on the mainframes 105, 106 are therefore another tier of the n-tier application architecture. However, in such a hybrid environment, it is a challenge to manage workload distribution. For example, an application executing on machine 103 may not know whether it is more advantageous to send workloads to applications on mainframe 105 or mainframe 106. Furthermore, it is challenging to manage switching between sites 101, 102 during disaster recovery (in the event one of the sites 101, 102 fails or otherwise experiences errors).

Advantageously, the architecture 100 enables the integration of isolated workload managers (e.g., the workload managers 109, and the global workload manager 111) using the SASP protocol. Specifically, the SASP listeners 110 on the machines 103, 104 may exchange weight recommendations via the global workload manager 111 and the local workload managers 109. The weight recommendations may correspond to routing weights by which applications in the architecture 100 route data. The SASP listeners 110 may map the received weight recommendations to a native format that enables seamless transparent workload distribution between the distributed OLTP servers $107_{1-N}$ and the mainframes 105, 106.

As shown, the global workload manager 111 communicates with the SASP listeners 110 via the SASP protocol. The SASP listeners 110 may send metadata or other state information describing the state of applications executing on the application servers $108_{1-N}$, as well as resource utilization levels on each host machine 103, 104. Therefore, for example, the SASP listener 110 on host machine 103 may transmit an indication of workload factors (e.g., latency, health factors, load levels, and the like) for an application $108_N$ to the global workload manager 111. Similarly, the SASP listener 110 may transmit an indication of the resource utilization levels of machine 103 to the global workload manager 111.

Furthermore, as shown, the mainframes 104, 106 include a monitor 113, which is an agent configured to monitor the OLTP applications $112_{1-N}$ to collect performance-related metadata describing each application $112_{1-N}$. In at least one embodiment, the monitors 113 may compute a score for each application and/or host machine. The score may reflect an overall performance level of the application and/or host machine. The monitors 113 may send the collected metadata and computed scores to the global workload manager 111. The scores may be used by the global workload manager 111 (and/or workload managers 109) to determine how to perform load balancing in each tier of the middleware environment.

Each SASP listener 110 on machines 103, 104 is configured to register with the global workload manager 111. During registration, the SASP listeners 110 subscribe to receive weight information for OLTP instances $112_{1-N}$ on the mainframes 105, 106. The SASP listeners 110 may also specify a set of applications and/or machines requiring monitoring. In such embodiments, the global workload manager 111 may invoke the monitor 113 to monitor the requested applications and/or machines, and provide information regarding the requested applications and/or machines to the requesting SASP listener 110.

Once registered, the SASP listener 110 executing on machine 104 may provide the monitoring information received from the global workload manager 111 to the WLM 109, which may then reference translation rules to map the received information to a format understood by the WLM 109. Therefore, for example, if 100% of the RAM and CPU of host machine 103 or mainframe 105 are currently being used, the WLM 109 may generate a routing rule that specifies to route workloads to the OLTP applications $112_{1-N}$ executing on mainframe 106. As another example, the global workload manager 111 may receive metadata from the monitor 113 on the mainframe 106. The metadata may indicate that there has been a failure in site 102. As such, the global workload manager 111 may transmit this information to the SASP listeners 110 of machines 103, 104 to facilitate disaster recovery (including commands to quiesce, deactivate, and activate applications). The WLM 109 of machines 103, 104 may then define routing rules which specifies to not send any traffic to site 102, but rather to forward all workloads within site 101.

Figure 2:
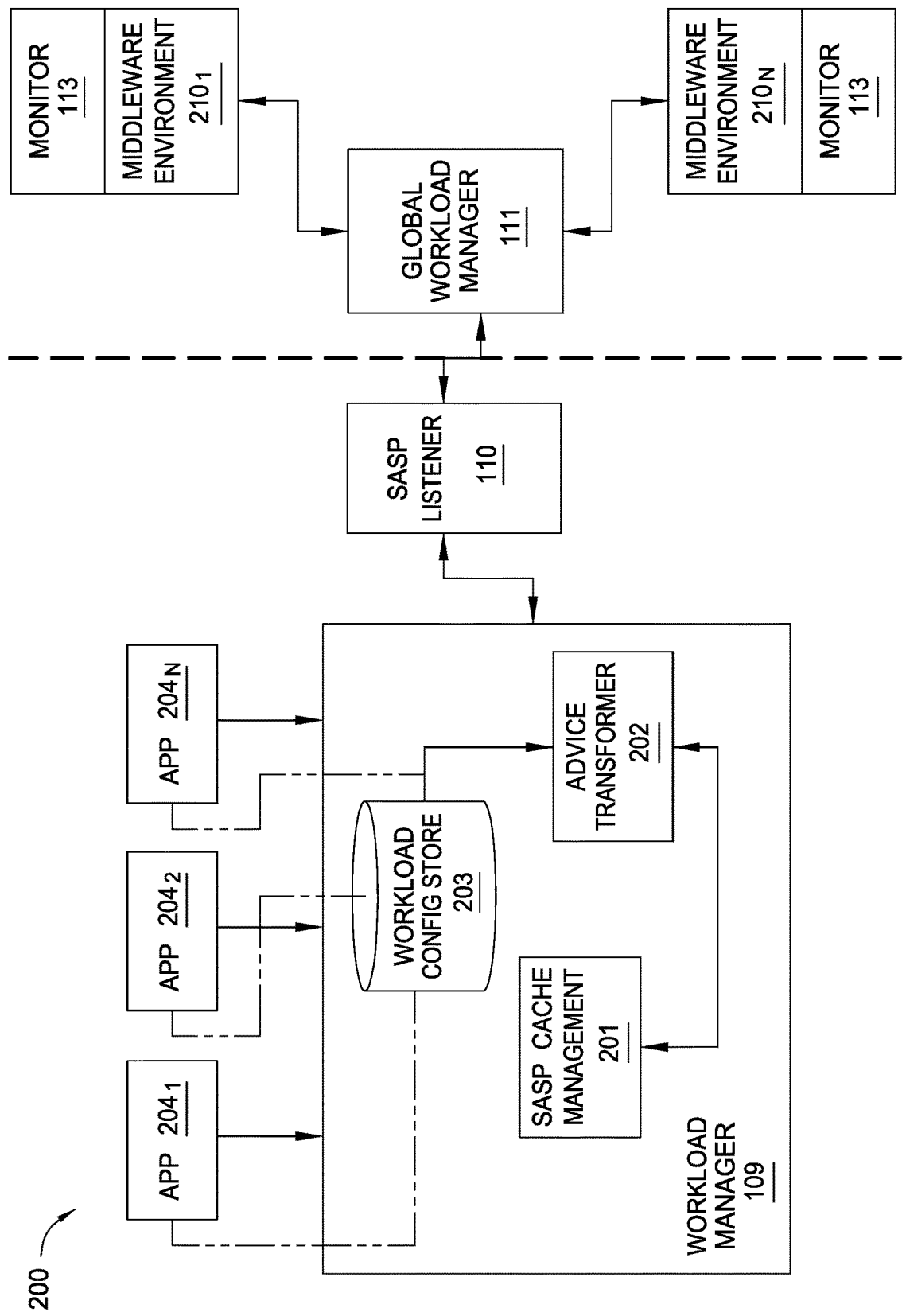
FIG. 2 is a schematic illustrating a more detailed view of the system which provides efficient transaction level workload management across multi-tier heterogeneous middleware clusters, according to one embodiment.

FIG. 2 is a schematic 200 illustrating a more detailed view of the system architecture which provides efficient transaction level workload management across multi-tier heterogeneous middleware clusters, according to one embodiment. As shown, the workload manager includes a SASP cache management 201, an advice transformer 202, and a workload configuration store 203. The SASP cache management 201 is configured to cache the weight and other information received from all tiers of the middleware environment in real time for further queries by clients, applications, and other components in the system. The workload configuration store 203 includes rules to map weight and other performance information received from other workload managers 109, the SASP listener 110, and global workload manager 111. The advice transformer 202 may apply the rules from the workload configuration store 203 to load balance connections, sessions, and workload data between different tiers of the n-tier application architecture. Doing so allows the applications $204_{1-N}$ and the WLM 109 itself to make load balancing (or routing) decisions based not only on local conditions, but the conditions of hardware and software in other tiers of the n-tier application architecture.

As shown, the global workload manager 111 communicates with two different middleware environments $210_1$ and $210_N$. Although two middleware environments $210_{1-N}$ are depicted, any number of middleware environments may be provided. In at least one embodiment, the middleware environments $210_{1-N}$ correspond to the mainframes 105, 106, respectively. As shown, the middleware environments 210 include an instance of the monitor agent 113, which provides metadata describing applications and/or hardware in the middleware environments $210_{1-N}$ to the global workload manager 111. Again, the metadata may include resource utilization levels, health scores, availability, and the like. The global workload manager 111 is configured to receive (either in a push or pull manner), workload factors from the monitor agent 113 of the middleware environments $210_{1-N}$. In at least one embodiment, however, the global workload manager 111 includes an instance of the monitor 113, which may gather metadata for each application and/or machine in each middleware environment. The global workload manager 111 may then transmit this information to the SASP listener 110 in the distributed platform via the SASP protocol. Once received, the SASP listener 110 may distribute the information to the workload manager 109, which in turn provides the information to all connected middleware environments (e.g., the applications $204_{1-N}$, executing on the application servers $108_{1-N}$). The workload manager 109 may then update the SASP cache management 201 with the information received from the SASP listener 110.

The workload manager 109 may subscribe for a push or pull of the information from the SASP listener 110. Similarly, the applications $204_{1-N}$ may subscribe for a push or pull of information from the workload manager 109. When in push mode, the workload manager 109 and SASP listener may push new information whenever a change is detected (e.g., a failure, fresh reboot of a previously failed system, etc.). When in pull mode, the applications $204_{1-N}$ and/or the workload manager 109 may periodically request the information from the workload manager 109 or the SASP listener 110, respectively.

The advice transformer 202 may then read the information in the workload configuration store 203 to determine the rules that are applied to map the received information to a local, native format. In at least one embodiment, the advice transformer 202 may use the rules to compute a score for each application instance and/or host machine in the middleware environments $210_{1-N}$. Once transformed, the applications $204_{1-N}$ and/or WLM 109 use the scores to route connections, sockets, and transactions to the middleware environments $210_{1-N}$.

For example, OLTP applications $112_{1-N}$ may execute in middleware environments $210_{1-N}$. The applications $204_{1-N}$ may each need to interface with one or more of the applications $112_{1-N}$ to process data. For example, the application $204_1$ may process a first portion of a workload in a distributed fashion, while application $112_1$ may process a second portion (or stage) of the workload. However, before sending the workload to application $112_1$, the application $204_1$ may need to determine which instance of application $112_1$ to send the workload to. The SASP listener 110 may therefore ask the global workload advisor 111 to provide metadata describing each instance of application $112_1$ in middleware environments $210_{1-N}$. The global workload advisor 111 may then transmit an indication the monitors 113 to monitor each respective instance of application $112_1$ in the respective middleware environment. The monitors 113 may monitor the performance of each instance of application $112_1$, and may optionally compute a score for each instance of the application $112_1$. The monitors 113 may provide the information to the global workload manager 111, which may then forward the information to the SASP listener 110 via the SASP protocol. The SASP listener 110 may then provide the information to the workload manager 109, which stores the information in the SASP cache management 201. The workload manager 109 may then invoke the advice transformer 202, which references rules in the workload configuration store 203 for translating the received information to a format understood by the workload manager 109 and/or the applications $204_{1-N}$. The workload manager 109 may then update the SASP cache management 201 with the native information generated by the advice transformer 202.

Therefore, when the application $204_1$ needs to make an initial connection to one of the middleware environments $210_{1-N}$, the application $204_1$ (and/or the workload manager 109) may reference the SASP cache management 201 to determine which middleware environment $210_{1-N}$ is best suited to handle the connection. For example, the SASP cache management 201 may include metadata indicating that middleware environment $210_1$ has a score of 0.90 on a scale from 0-1, while middleware environment $210_N$ has a score of 0.55. Based on these scores, the application $204_1$ may connect to middleware environment $210_1$, rather than environment $210_N$. Once the connection is established, a connection between application $204_1$ and each application hosted in the middleware environment $210_1$ is established. Application $204_1$ may then create any number of sessions over this connection, which may target any number of applications or hosts in the middleware environment $210_1$. Advantageously, however, before establishing each session, the application $204_1$ (and/or the workload manager 109) may reference the SASP cache management 203 to determine which is the best application and/or host for establishing the session. Again, in at least one embodiment, the application $204_1$ (and/or the workload manager 109) may reference the score for each application or host in determining how to distribute the load (e.g., each session and its corresponding workload or task data). As previously indicated, the connections and sessions may be in the same site or in different sites (which again may be based on scores for each site).

Figure 3:
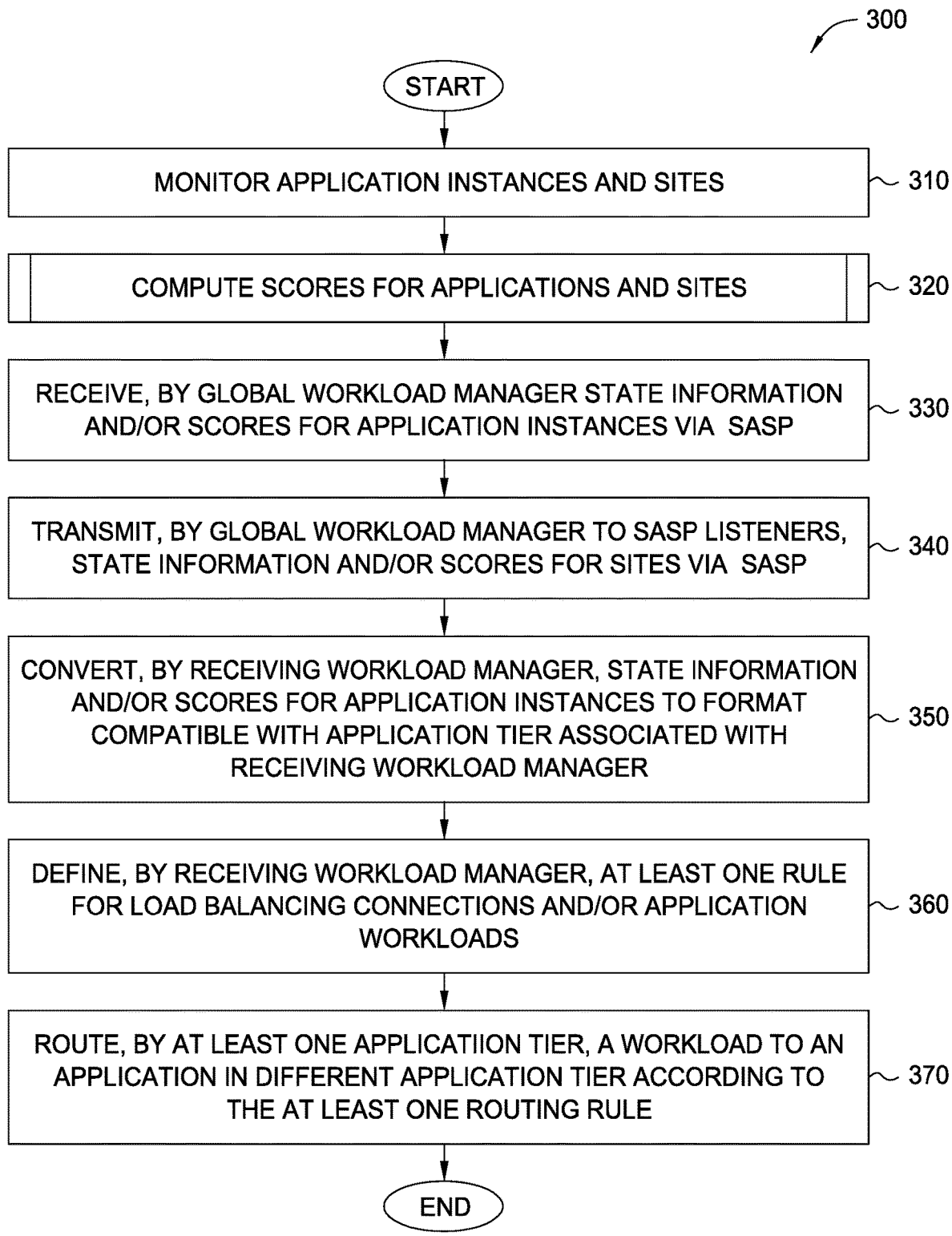
FIG. 3 is a flow chart illustrating a method to provide efficient transaction level workload management across multi-tier heterogeneous middleware clusters, according to one embodiment.

FIG. 3 is a flow chart illustrating a method 300 to provide efficient transaction level workload management across multi-tier heterogeneous middleware clusters, according to one embodiment. As shown, the method 300 begins at block 310, where each application instances and sites are monitored in a middleware environment. Generally, the monitoring includes health monitoring, performance monitoring, and the like. Example metadata attributes of an application and/or site are reproduced below:

autoinstall_load=3.0;
connection_scale=1.0;
equal_delta=0.0001;
health_adjustment_1=0.0;
health_adjustment_2=10.0;
health_adjustment_3=100.0;
health_adjustment_4=1000.0;
health_adjustment_5=10000.0;
health_timeout=120.0;
known_adjustment=0.05;
known_scale 1=0.0;
known_scale 2=0.0;
load_limit=600.0;
load_scale_1=0.0;
load_scale_2=1.0;
normalise_scale=0.00833;
reselection_limit=2;
retry_limit=2;
same_adjustment=0.10;
same_limit_1=5;
same_limit_2=10;

Based on the monitoring, a score may be computed for each application and/or site at block 320, which is described in greater detail with reference to FIG. 4. Generally, the score may be computed based on a weighting of one or more metadata attributes. At block 330, the global workload manager 111 may receive the state information and/or scores via the SASP protocol. At block 340, the global workload manager 111 may transmit the state information and/or scores to the SASP listeners 110. In at least one embodiment, the SASP listeners 110 inform the global workload manager 111 of which applications and/or hosts it they are interested in monitoring, and the global workload manager 111 provides the requested information to the SASP listeners 110. The SASP listeners 110 may then provide the received information to each workload manager 109 in the respective middleware environment. At block 350, described in greater detail with reference to FIG. 5, the workload manager 109 may convert the received state information and/or scores to a format compatible with the application tier associated with the receiving workload manager. For example, if a health score received for a first application is 9.0 on a 0-10 scale, and a receiving workload manager 109 operates on a scale from 0-1, the workload manager 109 may convert the score to the appropriate range. At block 360, the receiving workload manager 109 may define at least one rule for load balancing connections and/or application workloads. For example, the scores converted at block 350 may be used to define weightages for load balancing. At block 370, an application in the application tier may route a workload to an application in a different application tier according to the at least one routing rule.

Figure 4:
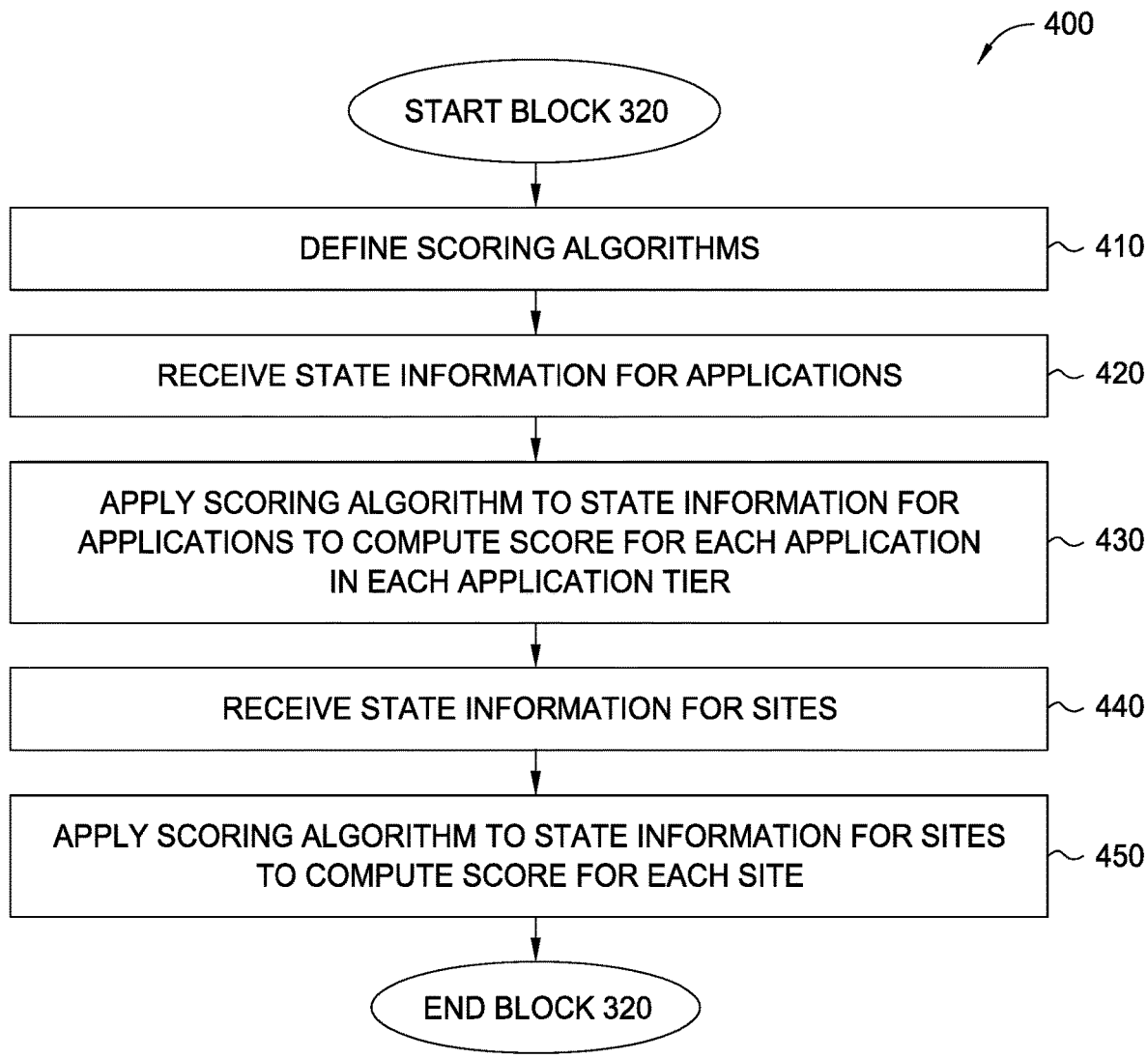
FIG. 4 is a flow chart illustrating a method to compute scores for applications and sites, according to one embodiment.

FIG. 4 is a flow chart illustrating a method 400 corresponding to block 320 to compute scores for applications and sites, according to one embodiment. As shown, the method 400 begins at block 410, where scoring algorithms are defined. Generally, the scoring algorithms may be predefined or user defined, and may be any algorithm sufficient to compute a score for an application and/or a middleware site. At block 420, state information for each of a plurality of applications is received. In at least one embodiment, the monitor 113 receives the state information. In another embodiment, the global workload manager 111 receives the state information. The state information may include any type of metadata describing the health, performance (e.g., resource utilization rates), availability, or any other attribute of an application and/or site. At block 430, the global workload manager 111 and/or the monitor 113 may apply a scoring algorithm to the state information to compute a score for each application in a given application tier. At block 440, the global workload manager 111 may receive state information for each of a plurality of physical middleware sites. The state information may again include any attribute of a site, such as workload, resource utilization rates, availability, latency, and the like. At block 450, the global workload manager 111 may apply a site scoring algorithm to the state information for each site to compute a score for each site. The global workload manager 111 may then store the scores computed at blocks 430 and/or 450. The global workload manager 111 may further transmit these scores to the SASP listeners 110 via the SASP protocol, which passes the information to the workload manager 109. The workload manager 109 may then store the information in the SASP cache management 201.

Figure 5:
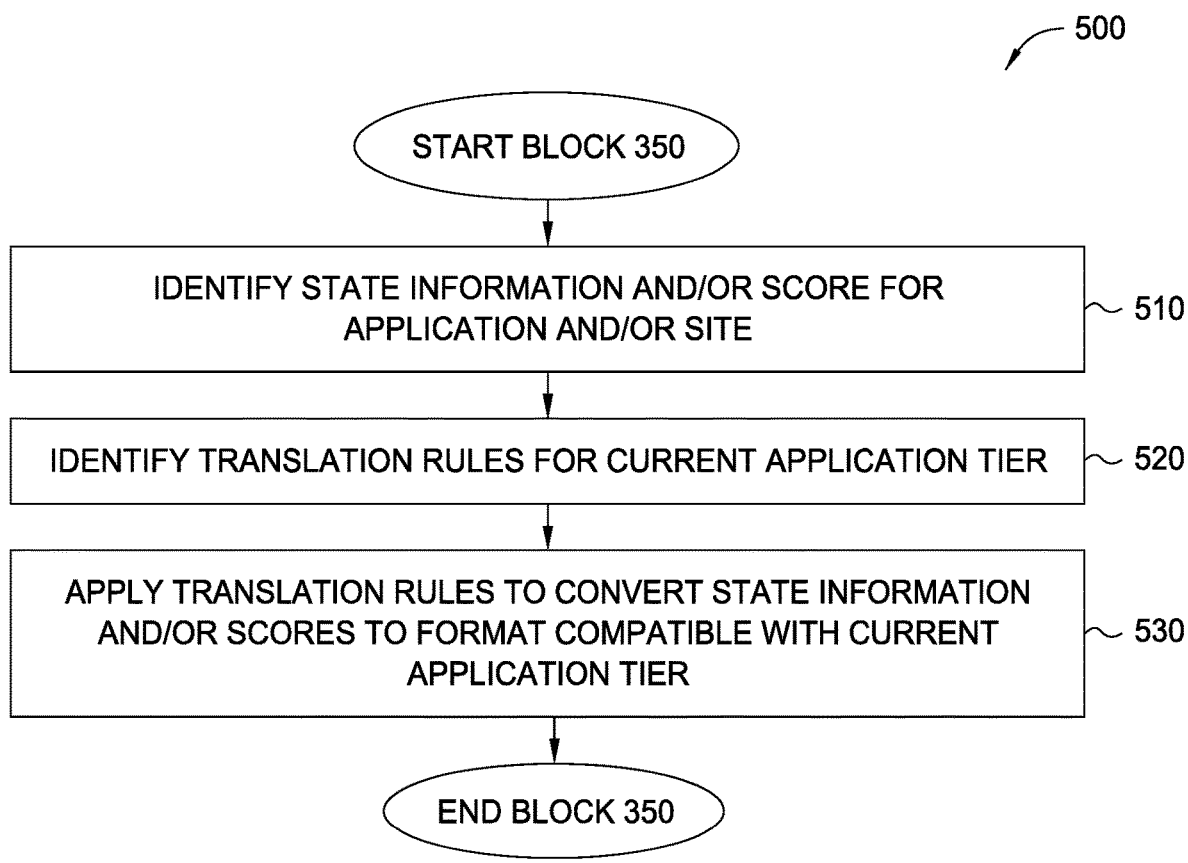
FIG. 5 is a flow chart illustrating a method to convert state information to a compatible format, according to one embodiment.

FIG. 5 is a flow chart illustrating a method 500 corresponding to block 350 to convert state information to a compatible format, according to one embodiment. In at least one embodiment, the workload manager 109 of a given middleware tier performs the method 500. As shown, the method 500 begins at block 510, where the workload manager 109 identifies the state information and/or scores for an application and/or a site. Because the score for an application may consider resource utilization levels, the score for an application may also reflect attributes of a host machine. At block 520, the advice transformer 202 may identify the applicable translation rules stored in the workload configuration store 203. The following reflects example information that may be stored in the workload configuration store 203:

"Groups": "GRP1",
"Members": "CICSTS01", "CICSTS02", "CICSTS03",
"Primary endpoints": "<ip address>",
"Secondary endpoints": "<ip address>",
"health factor": 1.0,
"health score range start": 0,
"health score range end": 1.0

At block 530, the advice transformer 202 may apply the rules in the workload configuration store 203 to the information stored in the SASP cache management 201 to convert the information into a format compatible with the current workload manager 109 and/or its associated applications and middleware environment. The converted information may then be stored in the SASP cache management 201 for use by the workload manager 109 and/or applications in the middleware environment.

Figure 6:
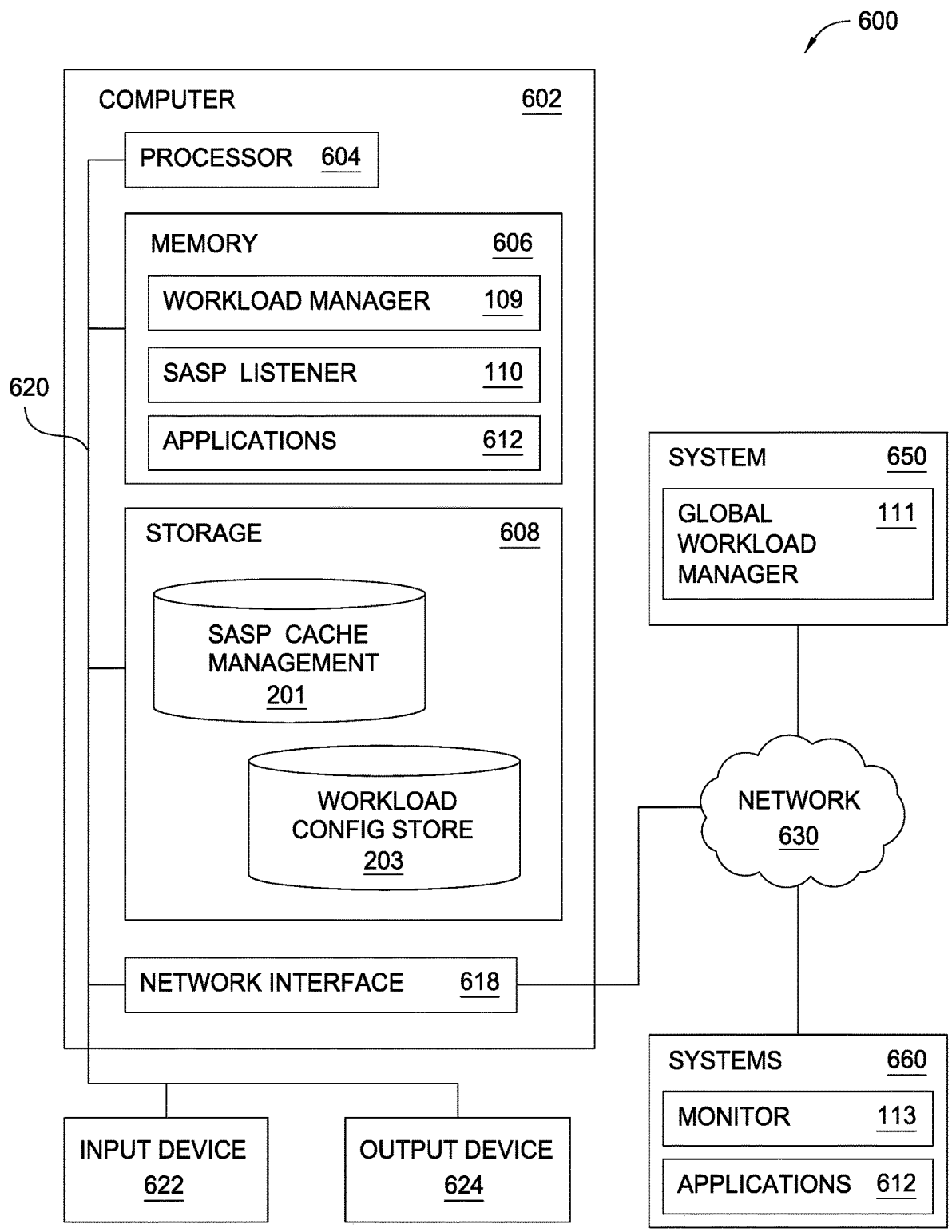
FIG. 6 is a block diagram illustrating a system configured to provide efficient transaction level workload management across multi-tier heterogeneous middleware clusters, according to one embodiment.

FIG. 6 is a block diagram illustrating a system configured to provide efficient transaction level workload management across multi-tier heterogeneous middleware clusters, according to one embodiment. The networked system 600 includes a computer 602. The computer 602 may also be connected to other computers via a network 630. In general, the network 630 may be a telecommunications network and/or a wide area network (WAN). In a particular embodiment, the network 630 is the Internet.

The computer 602 generally includes a processor 604 which obtains instructions and data via a bus 620 from a memory 606 and/or a storage 608. The computer 602 may also include one or more network interface devices 618, input devices 622, and output devices 624 connected to the bus 620. The computer 602 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 604 is a programmable logic device that performs instruction, logic, and mathematical processing, and may be representative of one or more CPUs. The network interface device 618 may be any type of network communications device allowing the computer 602 to communicate with other computers via the network 630.

The storage 608 is representative of hard-disk drives, solid state drives, flash memory devices, optical media and the like. Generally, the storage 608 stores application programs and data for use by the computer 602. In addition, the memory 606 and the storage 608 may be considered to include memory physically located elsewhere; for example, on another computer coupled to the computer 602 via the bus 620.

The input device 622 may be any device for providing input to the computer 602. For example, a keyboard and/or a mouse may be used. The input device 622 represents a wide variety of input devices, including keyboards, mice, controllers, and so on. Furthermore, the input device 622 may include a set of buttons, switches or other physical device mechanisms for controlling the computer 602. The output device 624 may include output devices such as monitors, touch screen displays, and so on.

As shown, the memory 606 contains the workload manager 109, SASP listener 110, and a set of applications 612. The applications 612 may communicate with applications 612 on the system. The applications 612 on the computer 602 may reference the SASP cache management 201 to determine which system 660, or which instance of an application 612 on a system 660, to establish connections with, establish sessions via the connection, and forward workloads via each session. Doing so improves the overall performance of a middleware environment by facilitating routing decisions based on the current system state, even though the workload managers of each portion of the system are otherwise heterogeneous.

As shown, the storage 608 contains the SASP cache management 201 and the workload configuration store 203. The global workload manager 111 of the system 650 may transmit data describing each of a plurality of application instances and middleware systems to each SASP listener 110 in the middleware environment. These SASP listeners 110 may provide the information to the workload manager 109, which may translate the information into a native format based on the translation rules stored in the workload configuration store 203, and store the translated information in the SASP cache management 201. The SASP cache management 201 may therefore store routing rules used to load balance traffic and connections between different tiers of an n-tier application architecture in a middleware environment.

In the foregoing, reference is made to embodiments of the invention. However, it should be understood that the invention is not limited to specific described embodiments. Instead, any combination of the recited features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the recited aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data available in the cloud. For example, the SASP listener 110 could execute on a computing system in the cloud and transmit and receive health and state information with other SASP listeners 110 in a middleware environment. In such a case, the workload manager could generate native routing rules based on the shared information, and store the rules at a storage location in the cloud. Doing so allows a user to access this information from any computing system attached to a network connected to the cloud (e.g., the Internet).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method, comprising:
   receiving, by a first workload manager in a first middleware environment, state information for a plurality of applications executing in a second middleware environment, wherein the state information for the plurality of applications describes at least one of (i) health, (ii) performance, or (iii) availability of at least one of the plurality of applications, and wherein the first and second middleware environments are in a first physical site;
   defining, by the first workload manager based on the received state information for the plurality of applications executing in the second middleware environment, a first routing rule in the first middleware environment, wherein the first routing rule affects how workloads are routed in the first middleware environment;
   receiving, by the first workload manager, state information for the first physical site, wherein the state information for the first physical site describes at least one of (i) health, (ii) performance, or (iii) availability of the first physical site;

receiving, by the first workload manager from a global workload manager, state information for a second physical site distinct from the first physical site, wherein the state information for the second physical site describes at least one of (i) health, (ii) performance, or (iii) availability of the second physical site, and wherein the second physical site includes a third middleware environment;

defining a second routing rule by modifying, by the first workload manager, the first routing rule based on the state information for the first and second physical sites; and based on the second routing rule:
identifying, by a first application of a plurality of applications executing in the first middleware environment, a second application of a plurality of applications executing in the third middleware environment; and forwarding, by the first application of the plurality of applications executing in the first middleware environment, a first workload to the second application of the plurality of applications executing in the third middleware environment.

2. The method of claim 1, wherein the state information for the plurality of applications executing in the second middleware environment comprises a respective routing weight for each of the plurality of applications executing in the second middleware environment, wherein the respective routing weights are specific to the second middleware environment, the method further comprising prior to defining the first routing rule:

converting, in the first middleware environment, each of the respective routing weights specific to the second middleware environment to a respective routing weight specific to the first middleware environment.

3. The method of claim 1, wherein the state information for the plurality of applications executing in the second middleware environment is received by the first workload manager from a global workload manager via Server/Application State Protocol (SASP).

4. The method of claim 1, wherein the first application in the first middleware environment is communicably coupled to each of the plurality of applications in the third middleware environment via a network connection, wherein the first workload is forwarded to the second application in the third middleware environment as a first transaction issued via the network connection.

5. The method of claim 1, wherein the first middleware environment comprises a plurality of distributed online transaction processing (OLTP) servers, wherein the second middleware environment comprises at least one backend OLTP mainframe server.

6. A system, comprising:
a processor; and
a memory storing instructions which when executed by the processor performs an operation comprising:
receiving, by a first workload manager in a first middleware environment, state information for a plurality of applications executing in a second middleware environment, wherein the state information for the plurality of applications describes at least one of (i) health, (ii) performance, or (iii) availability of at least one of the plurality of applications, and wherein the first and second middleware environments are in a first physical site;

defining, by the first workload manager based on the received state information for the plurality of applications executing in the second middleware environment, a first routing rule in the first middleware environment, wherein the first routing rule affects how workloads are routed in the first middleware environment;

receiving, by the first workload manager, state information for the first physical site, wherein the state information for the first physical site describes at least one of (i) health, (ii) performance, or (iii) availability of the first physical site;

receiving, by the first workload manager from a global workload manager, state information for a second physical site distinct from the first physical site, wherein the state information for the second physical site describes at least one of (i) health, (ii) performance, or (iii) availability of the second physical site, and wherein the second physical site includes a third middleware environment;

defining a second routing rule by modifying, by the first workload manager, the first routing rule based on the state information for the first and second physical sites; and based on the second routing rule:
identifying, by a first application of a plurality of applications executing in the first middleware environment, a second application of a plurality of applications executing in the third middleware environment; and forwarding, by the first application of the plurality of applications executing in the first middleware environment, a first workload to the second application of the plurality of applications executing in the third middleware environment.

7. The system of claim 6, wherein the state information for the plurality of applications executing in the second middleware environment comprises a respective routing weight for each of the plurality of applications executing in the second middleware environment, wherein the respective routing weights are specific to the second middleware environment, the operation further comprising prior to defining the first routing rule:

converting, in the first middleware environment, each of the respective routing weights specific to the second middleware environment to a respective routing weight specific to the first middleware environment.

8. The system of claim 6, wherein the state information for the plurality of applications executing in the second middleware environment is received by the first workload manager from a global workload manager via Server/Application State Protocol (SASP).

9. The system of claim 6, wherein the first application in the first middleware environment is communicably coupled to each of the plurality of applications in the third middleware environment via a network connection, wherein the first workload is forwarded to the second application in the third middleware environment as a first transaction issued via the network connection.

10. The system of claim 9, wherein the first middleware environment comprises a plurality of distributed online transaction processing (OLTP) servers, wherein the second middleware environment comprises at least one backend OLTP mainframe server.

11. A computer program product, comprising:
a non-transitory computer-readable storage medium having computer-readable program code embodied therewith, the computer-readable program code executable by one or more computer processors to perform an operation comprising:
   receiving, by a first workload manager in a first middleware environment, state information for a plurality of applications executing in a second middleware environment, wherein the state information for the plurality of applications describes at least one of (i) health, (ii) performance, or (iii) availability of at least one of the plurality of applications, and wherein the first and second middleware environments are in a first physical site;
   defining, by the first workload manager based on the received state information for the plurality of applications executing in the second middleware environment, a first routing rule in the first middleware environment, wherein the first routing rule affects how workloads are routed in the first middleware environment;
   receiving, by the first workload manager, state information for the first physical site, wherein the state information for the first physical site describes at least one of (i) health, (ii) performance, or (iii) availability of the first physical site;
   receiving, by the first workload manager from a global workload manager, state information for a second physical site distinct from the first physical site, wherein the state information for the second physical site describes at least one of (i) health, (ii) performance, or (iii) availability of the second physical site, and wherein the second physical site includes a third middleware environment;
   defining a second routing rule by modifying, by the first workload manager, the first routing rule based on the state information for the first and second physical sites; and based on the second routing rule:
     identifying, by a first application of a plurality of applications executing in the first middleware environment, a second application of a plurality of applications executing in the third middleware environment; and
     forwarding, by the first application of the plurality of applications executing in the first middleware environment, a first workload to the second application of the plurality of applications executing in the third middleware environment.

12. The computer program product of claim 11, wherein the state information for the plurality of applications executing in the second middleware environment comprises a respective routing weight for each of the plurality of applications executing in the second middleware environment, wherein the respective routing weights are specific to the second middleware environment, the operation further comprising prior to defining the first routing rule:
   converting, in the first middleware environment, each of the respective routing weights specific to the second middleware environment to a respective routing weight specific to the first middleware environment.

13. The computer program product of claim 11, wherein the state information for the plurality of applications executing in the second middleware environment is received by the first workload manager from a global workload manager via Server/Application State Protocol (SASP).

14. The computer program product of claim 11, wherein the first application in the first middleware environment is communicably coupled to each of the plurality of applications in the third middleware environment via a network connection, wherein the first workload is forwarded to the second application in the third middleware environment as a first transaction issued via the network connection.

\* \* \* \* \*